US008978568B2

(12) United States Patent
Mercado et al.

(10) Patent No.: US 8,978,568 B2
(45) Date of Patent: Mar. 17, 2015

(54) CHAIN RELEASE APPARATUSES AND METHODS

(75) Inventors: Michael Mercado, Washington, DC (US); Gerritt Lang, Washington, DC (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 463 days.

(21) Appl. No.: 13/447,528

(22) Filed: Apr. 16, 2012

(65) Prior Publication Data

US 2013/0270497 A1  Oct. 17, 2013

(51) Int. Cl.
*B63B 21/18* (2006.01)
*F16G 3/00* (2006.01)
*B25B 27/22* (2006.01)

(52) U.S. Cl.
CPC ................. *F16G 3/006* (2013.01); *B63B 21/18* (2013.01); *B25B 27/22* (2013.01)
USPC ........................................ 114/200; 254/89 H

(58) Field of Classification Search
CPC ......... F16G 3/006; B63B 21/10; B63B 21/18; B63B 21/22; B63B 21/46
USPC ..... 254/93 R, 89 H, 133 R, 2 B, 4 R, 6 B, 12, 254/134, 253, 254, 255, 256, 257, 258, 254/259; 29/426.1, 525.01; 59/93, 89; 114/210, 293, 200
See application file for complete search history.

(56) References Cited

U.S. PATENT DOCUMENTS

| | | | | | |
|---|---|---|---|---|---|
| 2,639,890 | A | * | 5/1953 | Haubert | 254/133 R |
| 3,332,562 | A | * | 7/1967 | Kokott | 414/563 |
| 3,612,482 | A | * | 10/1971 | Eck | 254/93 R |
| 3,845,935 | A | * | 11/1974 | Chambers | 254/110 |
| 3,859,946 | A | * | 1/1975 | Hammerschlag | 114/200 |
| 4,612,869 | A | * | 9/1986 | Poppe | 114/293 |

* cited by examiner

*Primary Examiner* — Sang Kim
*Assistant Examiner* — Nathaniel Adams
(74) *Attorney, Agent, or Firm* — Christopher L. Blackburn; James M. Saunders

(57) ABSTRACT

An apparatuses and methods to release a chain. Apparatuses and methods include an electronic, mechanical, or electromechanical actuator system used to rotate a hooking arm. The actuator system includes an extendable piston. In some embodiments, the actuator system is hydraulic. In other embodiments, the actuator system is pneumatic.

3 Claims, 3 Drawing Sheets

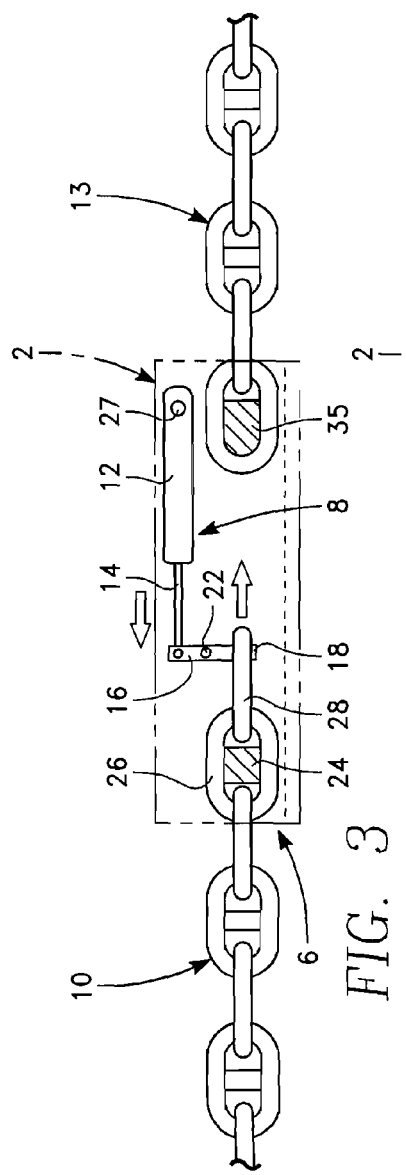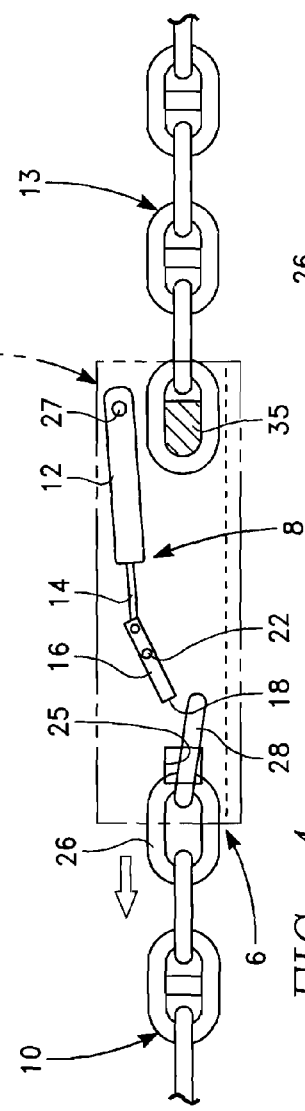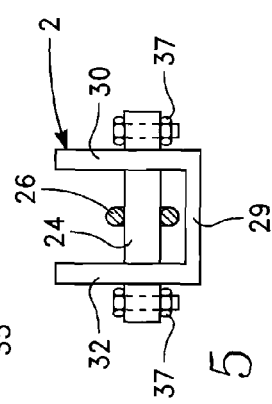
FIG. 3
FIG. 4
FIG. 5

CHAIN RELEASE APPARATUSES AND METHODS

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

Embodiments of the invention generally relate to chain release mechanisms and methods.

BRIEF DESCRIPTION OF THE DRAWINGS

FIG. 3 is a side view of an embodiment of the invention illustrating an embodiment of a hooking arm rotated to reduce load-pin tension force from an embodiment of a load pin.

FIG. 4 is a side view of an embodiment of the invention illustrating release of an embodiment of a chain.

FIG. 5 is a front view of an embodiment of the invention.

It is to be understood that the foregoing and the following detailed description are exemplary and explanatory only and are not to be viewed as being restrictive of the invention, as claimed.

DETAILED DESCRIPTION OF EMBODIMENTS OF THE INVENTION

Figure 1:
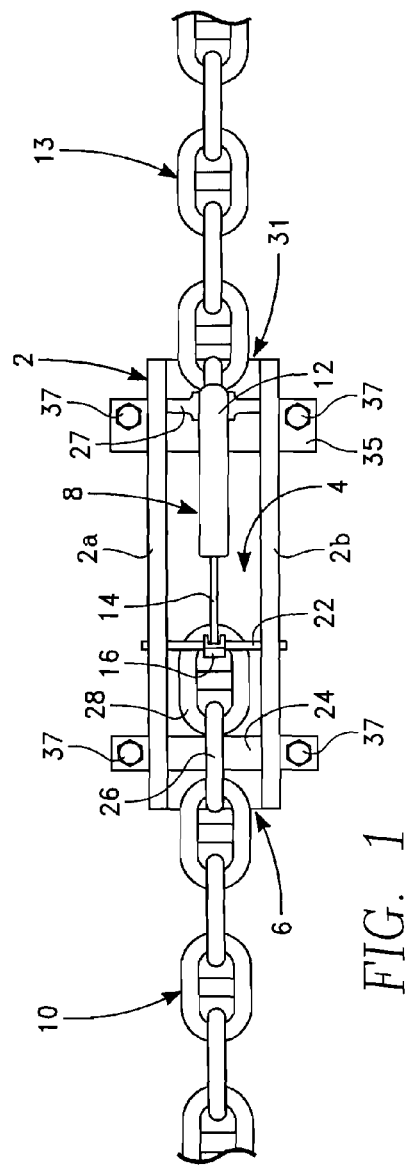
FIG. 1 is a top perspective view of an embodiment of the invention securing a high tensile strength chain(s).

Note that like reference numbers are used herein to designate like parts or elements. With reference to FIG. 1, chain 10 is connected to chain 13 via an embodiment of an apparatus according to principles of the invention. Secondary pin 35 is included in some embodiments to secure chain 13 so that release of chain 10 from connection to chain 13 requires removal of load-pin 24. Note that in some embodiments, chain 13 is an end of chain 10 (in which case a first end of chain 10 is secured prior to release by load pin 24 and a second end of chain 10 is secured by secondary pin 35 prior to, and/or after, release).

With reference to FIG. 1, apparatus embodiments include a body 2 forming a longitudinal passage 4 having a first longitudinal end 6 (opposite a second longitudinal end 31). In some embodiments, the body 2 comprises a first wall 2a, a second wall 2b opposing the first wall 2a, and a longitudinal passage between the first wall 2a and the second wall 2b. The longitudinal passage 4 is so dimensioned as to accommodate longitudinal movement of at least two consecutive chain links 26, 28 of an extended portion of a high-tensile chain 10 (wherein the at least two consecutive chain links are longitudinally disposed between the first wall 2a and the second wall 2b).

With reference to FIG. 5, in some embodiments, the body 2 is cross-sectionally u-shaped and includes a rectangular base 29, wherein the first wall 2a and the second wall 2b are about perpendicular to, and project in the same direction from, the long sides of the base 29.

With reference to FIGS. 1-4, embodiments further include an electronic, mechanical, or electro-mechanical actuator system 8 used to rotate a hooking arm 16. The actuator system 8 includes an extendable piston 14. In some embodiments, the actuator system 8 is hydraulic. In other embodiments, the actuator system 8 is pneumatic.

Embodiments employing a hydraulic system as actuator system 8 include a hydraulic cylinder 12 and an extendable piston 14. The hydraulic system 8 is removably associated with the body 2 and longitudinally disposed within the longitudinal passage 4. When installed, the distal end of the extendable piston 14 is closer to the first longitudinal end 6 when the hydraulic system 8 is pressurized than when the hydraulic system 8 is unpressurized.

With reference to FIGS. 1-4, some embodiments further include a hydraulic system pin 27 to pivotally fix the hydraulic system 8, wherein the hydraulic system pin 27 traverses the passage and travels through the base of the hydraulic system (cylinder) 8 when installed.

With reference to FIGS. 1-4, embodiments further include a hooking arm 16 associated with the distal end of the extendable piston 14. When in use (sometime prior to release of the chain), the high-tensile chain applies load-pin tension force to the hooking arm 16 between the hooking arm pin 22 and the hooking end 18. In some embodiments, the hooking arm 16 is a pawl.

Figure 2:
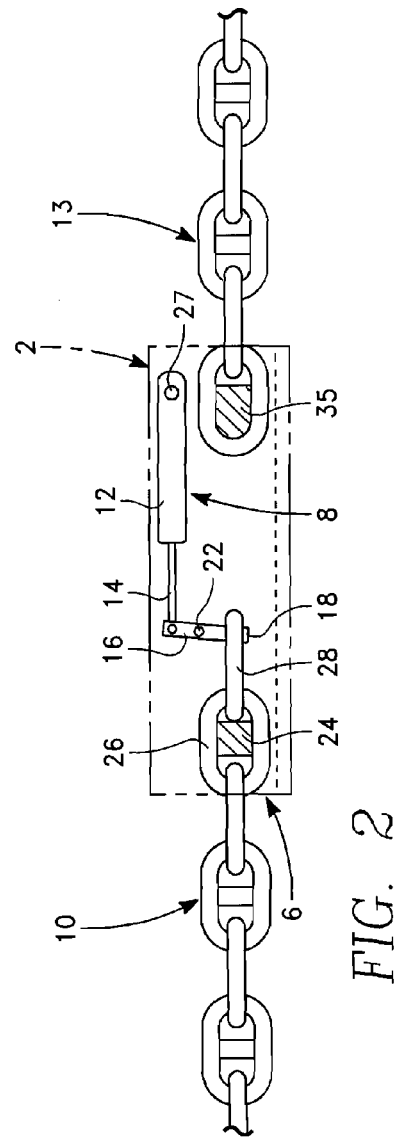
FIG. 2 is a side view of an embodiment of the invention securing a high tensile strength chain(s).

With reference to FIGS. 1-4, embodiments include a hooking arm pin 22 that pivotally supports the hooking arm 16 at a pivot point. The hooking arm 16 is disposed and configured to rotate about the pivot point such that the hooking end of the hooking arm 16 is in a first position (see FIG. 2) when the extendable piston is in a first position, a second position (see FIG. 3) when the extendable piston is in a second position, and a third position (see FIG. 4) when the extendable piston is in a third position. The hooking end of the hooking arm 16 is closer to the first longitudinal end of the body 2 when the hooking arm 16 is in the first position than when the hooking arm 16 is in the second position, and the hooking end of the hooking arm 16 is closer to the first longitudinal end of the body 2 when the hooking arm 16 is in the third position than when the hooking arm 16 is in the first position. In some embodiments, the first position is realized in response to a first amount pressure being applied to the actuator system 8, the second position is realized in response to a second amount of pressure being applied to actuator system 8, and the third position is realized in response to a third amount of pressure being applied to actuator system 8. In some embodiments, the hooking arm pin 22 extends from the first wall, through the hooking arm pin 22, to the second wall. The pivot point is longitudinally forward of ("longitudinally forward" means closer to the first end) the actuator system pivot point. Note that the positions of the hooking arm 16 illustrated in FIGS. 2-4 are exemplary positions. Any position alignment or grouping in which the hooking end of the hooking arm 16 is closer to the first longitudinal end of the body 2 when the hooking arm 16 is in the first position than when the hooking arm 16 is in the second position, and the hooking end of the hooking arm 16 is closer to the first longitudinal end of the body 2 when the hooking arm 16 is in the third position than when the hooking arm 16 is in the first position, and wherein the second position works to release load-pin tension force on the load-pin, and the third position does not prohibit longitudinal movement of the high-tensile strength chain is contemplated.

With reference to FIGS. 1, 2, 3, 5, and 6, embodiments further include a load pin 24 removably associated with the body 2; the removable association of the load pin 24 and the body 2 prohibits movement of the load pin 24 toward the first longitudinal end of the longitudinal passage when a load-pin tension force from an external load is applied to the load pin 24. As used in this specification including the claims, the phrase "load-pin tension force" describes a force in a forward longitudinal direction, wherein the forward longitudinal direction is from the load pin 24 toward the first longitudinal end of the body 2.

With reference to FIG. 4, in some embodiments, the first wall and second wall of the body 2 include a pair of oppposingly disposed load-pin apertures 25 with an opposingly disposed load-pin aperture 25 being located on each of the first and second walls and so configured as to receive the load pin. Note that FIG. 4 depicts a load-pin aperture with the unhatched box 25. The load pin apertures 25 can be a shape other than square so long as they're dimensioned to receive the load pin.

Figure 6:
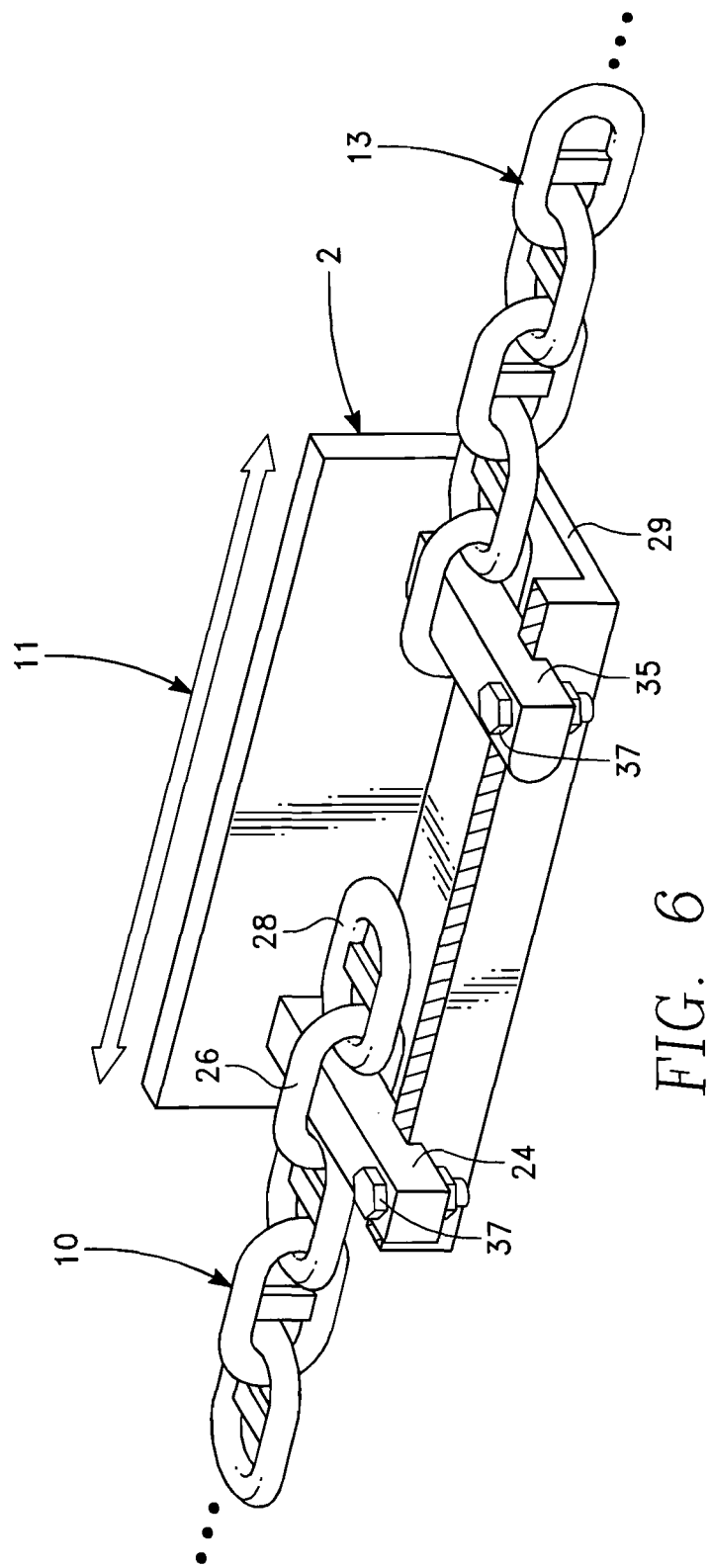
FIG. 6 is a side elevation view of an embodiment of the invention.

With reference to FIGS. 1 and 5-6, in some embodiments, safety components are included to prevent unintentional sliding removal of load pin 24 (thereby preventing pre-mature release of chain 10). In some embodiments, safety components 37 are safety bolts.

With reference to FIG. 1, in some embodiments, the narrowest portion of the longitudinal passage 4 from the first longitudinal end 6 to the longitudinal position of the hooking end of the hooking arm 16 when the hooking arm 16 is in the third position is wider than the outer width of the chain links of the high-tensile chain, so that the passage 4 can receive chain links of the high-tensile chain.

In some embodiments, the load pin 24 is so dimensioned as to traverse through a first chain link 26 of the high-tensile chain 28 longitudinally disposed within the longitudinal passage 4. When in use, the first chain link 26 applies the load-pin tension force to the load pin 24. Some apparatus embodiments are adapted to operate on a high-tensile chain (a workpiece) that is a mooring chain.

With reference to FIG. 1, in some embodiments, the load pin 24 is slidingly mountable on the body 2 such that it traverses through the first of the pair of oppositely disposed load-pin apertures, across the passage 4, and through a second of the pair of oppositely disposed load-pin apertures so that the load pin 24 is disposed transverse to the direction of the load-pin tension force. With reference to FIGS. 1, 2, 3, 5, and 6, in some embodiments, the load pin 24 and the body 2 are adapted and configured such that when the load pin 24 is slidingly mounted on the body 2, the load pin 24 and the body 2 experience a first amount force of friction when a first amount of the load-pin tension force is applied and a second amount force of friction when a second amount of the load-pin tension force is applied; the first amount force of friction being the force of friction between the load pin 24 and the body 2 at the pair of oppositely disposed load-pin apertures opposing sliding removal of the load pin 24 when the first amount of the load-pin tension force is applied, and the second amount force of friction being the force of friction between the load pin 24 and the body 2 at the pair of oppositely disposed load-pin apertures when the second amount of the load-pin tension force is applied. In these embodiments, the first amount of the load-pin tension force is greater than the second amount of load-pin tension force and the first amount force of friction is greater than the second amount force of friction.

With reference to FIGS. 1-3, in some embodiments, the hooking arm 16, hooking arm pin 22, and actuator system 8 are configured and oriented such that the hooking end of the hooking arm 16 is longitudinally behind ("longitudinally behind" means farther from the first end than) the load-pin 24 when the hooking arm 16 is in the second position and the third position; wherein the hooking arm 16 is adapted to hook a second chain link 28 of the high-tensile chain while the load pin 24 is slidingly mounted on the body 2 through the first chain link when the hooking arm 16 is in the second position (the second chain link 28 being between the first chain link 26 and the first longitudinal end of the high-tensile chain).

With reference to FIG. 3, the hooking arm 16 and the actuator system cooperate to reduce the load-pin tension force from the first amount of load-pin tension force to the second amount of load-pin tension force by causing the hooking end of the hooking arm 16 to pull the high-tensile chain in a direction opposite to the load-pin tension force when actuator system 8 is pressurized to the second position. With reference to FIGS. 2 and 3, the pulling force is exerted during movement of the hooking arm 16 from a first position (illustrated exemplarily in FIG. 2) to a second position (illustrated exemplarily in FIG. 3). Longitudinal movement of the high-tensile chain toward the first longitudinal end is prohibited by the hooking arm 16 when the high-tensile chain is hooked by the hooking arm 16 in the second position. Reduction in load-pin tension force from the first amount of load-pin tension force to the second amount of load-pin tension force reduces force required to slidingly remove the load pin.

With reference to FIG. 4, in some embodiments, the hooking arm 16 is not transverse to the load pin 24 tension force when the hooking arm 16 is in the third position. In these embodiments, the hooking arm 16 is adapted and configured to release the high-tensile strength chain by angling the hooking arm 16 at an angle (with respect to the load-pin tension force) that does not prohibit longitudinal movement of the high-tensile strength chain toward the first longitudinal end when the hooking arm 16 is in the third position.

With reference to FIGS. 1-4, method embodiments include removably mounting a load pin 24 on a body 2 through a first chain link of a high tensile chain ("high tensile chain" as used herein is otherwise known and referred to as a "transport chain") by passing the load pin 24 through a first load pin 24 aperture on a first of a pair of opposing walls of the body 2, across a passage between the pair of opposing walls, and through a second load pin 24 aperture on a second of the pair of opposing walls; wherein the longitudinal passage has a first longitudinal end. The removable association of the load pin 24 and the body 2 prohibits movement of the load-pin toward the first longitudinal end.

Method embodiments further include hooking a second chain link of the high tensile chain with a hooking end of a hooking arm 16 associated with the distal end of an extendable piston of an actuator system; the extendable piston is removably associated with, and longitudinally disposed within, the body 2.

Method embodiments further include reducing load pin 24 tension force on the load-pin by actuating the actuator system, causing the hooking end of the hooking arm 16 to move the high-tensile chain in a direction opposite the load-pin tension force; wherein the direction of the load-pin tension force is longitudinal from the load pin 24 toward the first longitudinal end of the body 2. In embodiments employing a hydraulic system as an actuator system, the actuator system is actuated to reduce load pin tension force on the load-pin by increasing pressure to the hydraulic system.

Method embodiments further include removing the load pin 24.

Method embodiments further include releasing the high-tensile chain by causing the hooking end of the hooking arm 16 to rotate toward the first longitudinal end and discontinue its hooking association with the second chain link. In some embodiments, the 'causing the hooking end of the hooking arm 16 to rotate toward the first longitudinal end and discontinue its hooking association with the second chain link' task is performed by reducing pressure to the hydraulic system. In embodiments employing a hydraulic system as an actuator system, the actuator system is actuated to release the high-tensile chain by reducing pressure (relative to the pressure used to reduce the load-pin tension force) to the hydraulic system.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A chain release apparatus for acting on a mooring chain, comprising:
    a body forming a longitudinal passage having a first longitudinal end;
    an actuator system having a cylinder and an extendable piston having a distal end, wherein said actuator system is removable associated with said body and disposed within said longitudinal passage; said distal end of said extendable piston being closer to said first longitudinal end when said actuator system is actuated than when said actuator system is unactuated;
    a rectangular hooking arm associated with the distal end of said extendable piston; said rectangular hooking arm having a hooking end;
    a hooking arm pin, said hooking arm pin pivotally supporting said rectangular hooking arm at a pivot point;
    said rectangular hooking arm disposed and configured to rotate about the pivot point such that said hooking end of said rectangular hooking arm is in a first position when said cylinder is under a first amount of pressure, a second position when said cylinder is under a second amount of pressure, and a third position when said cylinder is under a third amount of pressure; wherein said hooking end of said rectangular hooking arm is closer to said first longitudinal end of said body when said rectangular hooking arm is in said first position than when said rectangular hooking arm is in said second position, and wherein said hooking end of said rectangular hooking arm is closer to said first longitudinal end of said body when said rectangular hooking arm is in said third position than when said rectangular hooking arm is in said first position;
    a cross-sectionally rectangular-shaped load pin removable associated with said body; said removable association of said cross-sectionally rectangular-shaped load pin and said body prohibiting movement of said cross-sectionally rectangular-shaped load pin toward said first longitudinal end of said longitudinal passage when a load-pin tension force from an external load is applied to said cross-sectionally rectangular-shaped load pin; wherein the direction of the load-pin tension force is longitudinal, and wherein said longitudinal direction is from said cross-sectionally rectangular-shaped load pin toward said first longitudinal end of said body;
    wherein said body comprises a first wall, a second wall opposing said first wall, and said longitudinal passage between said first wall and said second wall; wherein said longitudinal passage is so dimensioned as to accommodate longitudinal movement of at least two consecutive chain links of an extended portion of a first mooring chain longitudinally disposed between said first wall and said second wall; and a pair of oppositely disposed load-pin apertures defined by a first oppositely disposed load-pin aperture on said first wall and a second oppositely disposed load-pin aperture on said second wall;
    a cross-sectionally D-shaped secondary pin attached to said body, said cross-sectionally D-shaped secondary pin configured to secure at least one chain link of a second mooring chain longitudinally disposed between said first wall and said second wall;
    wherein said cross-sectionally rectangular-shaped load pin is secured to said body by a first pair of bolts orthogonally-positioned through said cross-sectionally rectangular-shaped load pin and diametrically-positioned on opposing sides of said first wall and said second wall;
    wherein said cross-sectionally D-shaped secondary pin is secured to said body by a second pair of bolts orthogonally-positioned through said cross-sectionally D-shaped secondary pin and diametrically-positioned on opposing sides of said first wall and said second wall;
    wherein a narrowest portion of said longitudinal passage from said first longitudinal end to the longitudinal position of said hooking end of said rectangular hooking arm when said rectangular hooking arm is in said third position is wider than the outer width of the chain links of the first mooring chain, wherein when said rectangular hooking arm is in said first position or said second position, each of said at least two consecutive chain links of an extended portion of said first mooring chain are configured to move longitudinally along the same axis.

2. The apparatus according to claim 1, wherein said first pair of bolts and said second pair of bolts are configured to prevent unintentional sliding removal of said cross-sectionally rectangular-shaped load pin and said cross-sectionally D-shaped secondary pin.

3. The apparatus according to claim 2, wherein said first pair of bolts and said second pair of bolts are safety bolts.

* * * * *